Feb. 12, 1963 H. J. DORNAK 3,077,172
BOAT HULL
Filed Feb. 11, 1960 2 Sheets-Sheet 1
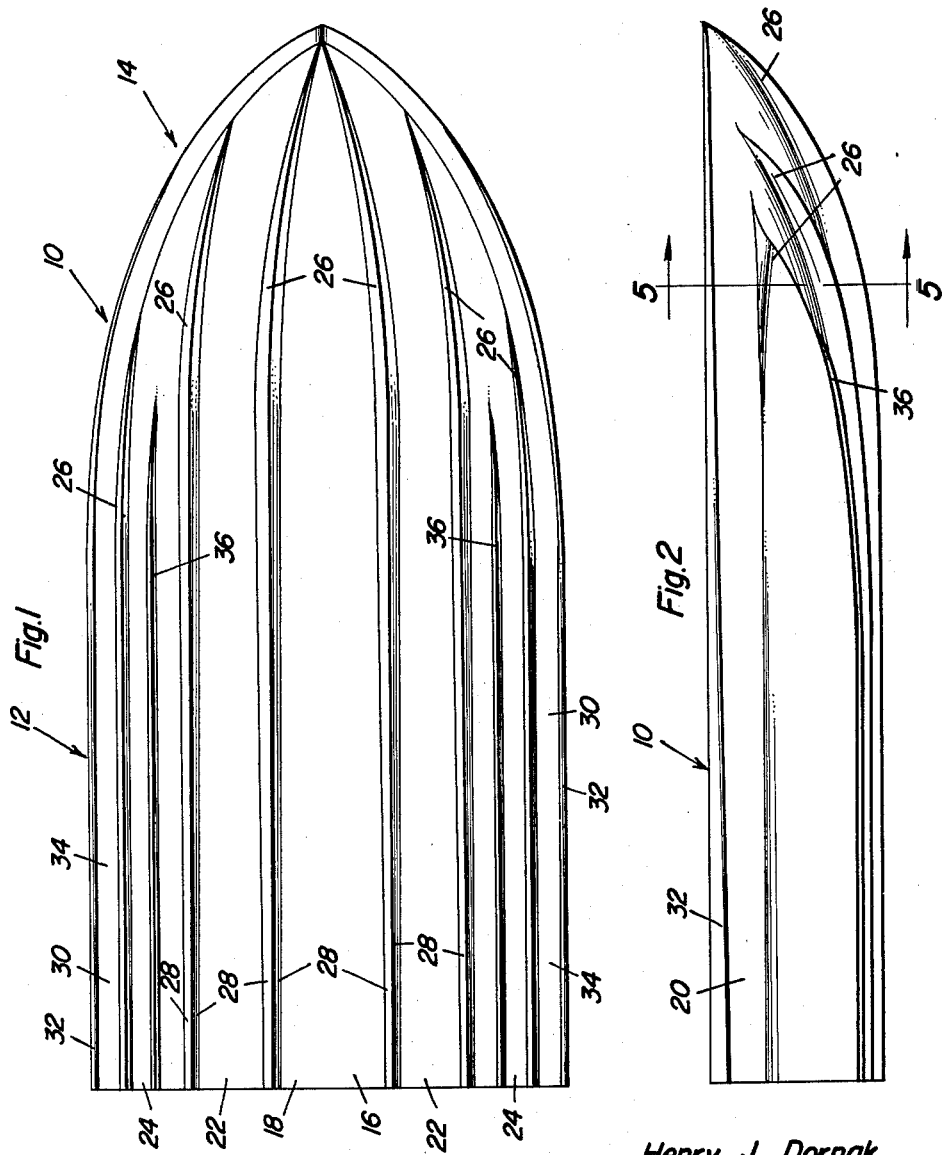
Henry J. Dornak
INVENTOR.

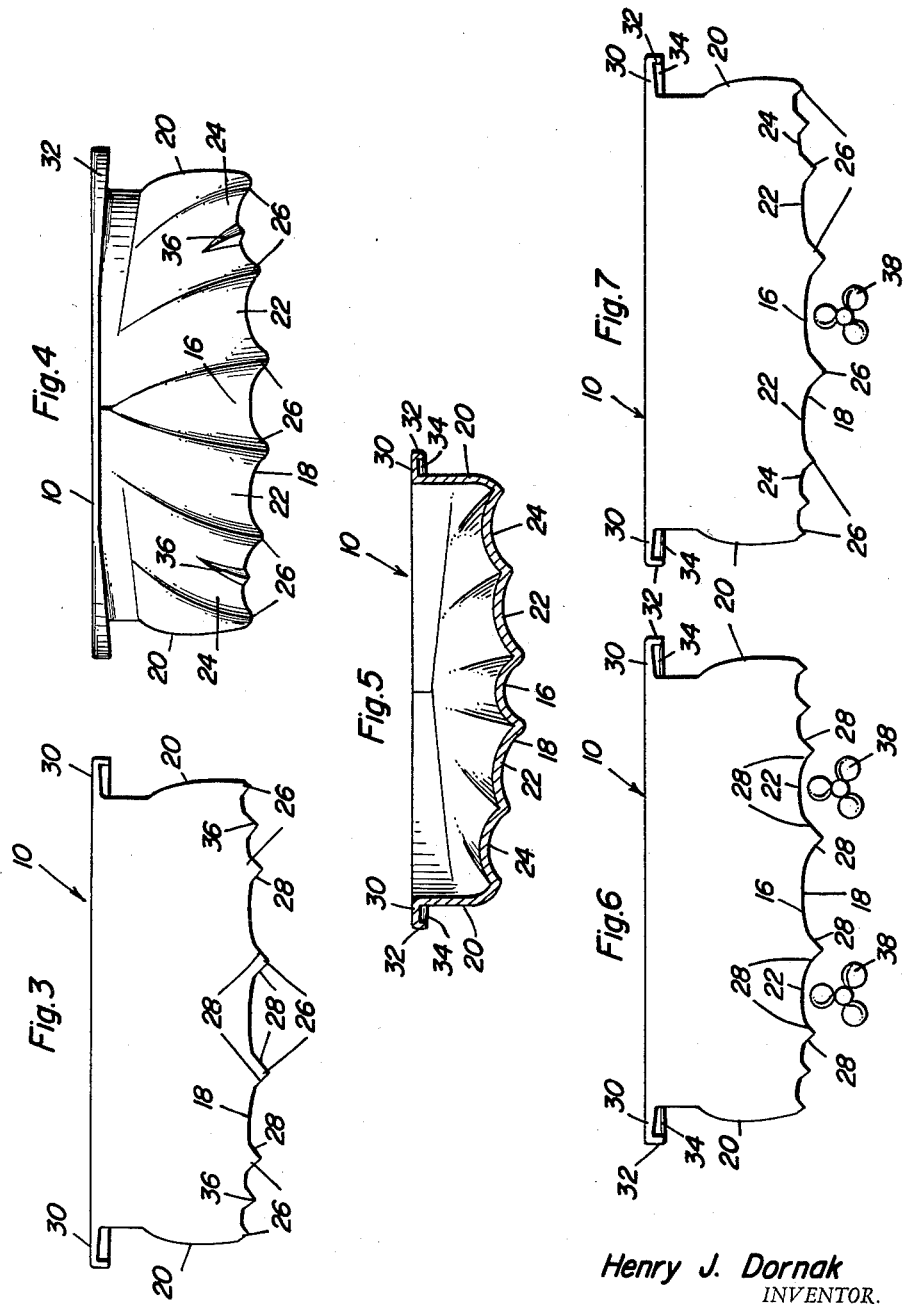

United States Patent Office 3,077,172
Patented Feb. 12, 1963

3,077,172
BOAT HULL
Henry J. Dornak, 601 S. Mechanic, El Campo, Tex.
Filed Feb. 11, 1960, Ser. No. 8,113
6 Claims. (Cl. 114—62)

This invention relates to a novel and useful hull construction, and more particularly to a hull construction utilizing a plurality of longitudinally extending concave tunnels which are specifically adapted to increase speed, safety, stability and performance as well as affording a smoother ride and increasing the planing characteristics of a hull to reduce the draft of the latter while moving at high speeds.

The multi-tunneled hull construction includes at least three longitudinally extending concave tunnels formed on the bottom surfaces of the hull with two additional side air tunnels being formed along the upper edges of the sides of the hull for increasing the stability of the latter while travelling at high speeds.

Various types of hull designs have been heretofore devised for accomplishing the utmost in speed, safety, and stability as well as smooth riding characteristics. Many of these prior hull designs have included means for entrapping air in concave or recessed tunnels and the like along the bottom surfaces of the hull whereby the riding characteristics and the speed of the hull will be appreciably increased. Most of these previous designs of hull structures have proven to be undesirable in one way or another and the hull construction comprising the present invention has been specifically adapted to eliminate any structural features which could be considered undesirable such as excessive wetted area in the region of the hull contacting the water when the hull is travelling at high speeds.

The hull comprises an aft portion and a forward portion with the tunnels formed in both portions with those in the aft portion being continuous with corresponding tunnels of the forward portion of the hull. The portions of the tunnels disposed on the aft portion of the hull extend substantially parallel to the longitudinal center line of the hull and the portions of the tunnels formed in the forward portion of the hull are inwardly converging and upwardly curving toward the bow of the hull. The tunnels are each defined by depending cut-waters disposed along the opposite longitudinal edges of the tunnels with the tunnels spaced transversely of the hull immediate adjacent each other. The cut-waters formed on the forward hull portion are formed by a series of three reversing curves and the cut-waters gradually taper rearwardly into two depending downwardly convergent straight surfaces disposed at substantially 90° to each other. Further, the cut-waters decrease in their vertical extent gradually from the forward portion of the hull to the aft portion thereof whereby the tunnels are decreased in depth from their forward ends to their rearward ends with the forward ends being substantially arcuate in cross section and their rearward ends being relatively shallow and inverted U-shaped in cross section.

The main object of this invention is to provide a hull structure which will closely approach the ultimate in speed, safety and stability while still maintaining an extremely smooth ride and hull having a shallow draft. Various types of hull structures have been heretofore designed for obtaining maximum speed, but these hull structures have proven to be lacking in stability, safety and smooth riding characteristics.

A further object of this invention, in accordance with the preceding object, is to provide a hull structure which will afford the maximum in speed with a propulsion unit of a given horsepower while maintaining water spray at a minimum.

A final object to be specifically enumerated herein is to provide a hull structure having various novel features which when combined will afford maximum speed while affording the maximum in smooth riding characteristics and maneuverability.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a bottom plan view of the hull construction comprising the instant invention;

FIGURE 2 is a side elevational view of the hull construction illustrated in FIGURE 1;

FIGURE 3 is a rear elevational view of the hull construction;

FIGURE 4 is a front elevational view of the hull construction showing more clearly the details of the configuration of and the relative positioning of the tunnels;

FIGURE 5 is a vertical transverse sectional view taken substantially upon the plane indicated by the section line 5—5 of FIGURE 2;

FIGURES 6 and 7 are rear elevational views of the hull construction similar to that of FIGURE 3 showing the manner in which the hull construction is particularly well adapted for both dual and single propeller installations.

Referring now more specifically to the drawings the numeral 10 generally designates the hull construction of the present invention which includes an aft portion 12 and a forward or bow portion 14. The hull construction 10 includes bottom surfaces 18 and side surfaces 20 which are substantially straight relative to their longitudinal length throughout the extent of the aft portion 12 of the hull construction 10. The side surfaces 20 of the forward or bow portion 14 are inwardly convergent toward the forward end of the hull 10 and the bottom surfaces 18 of the forward or bow portion 14 are upwardly curved toward the bow of the hull 10. The bottom surfaces 18 on the aft portion 12 of the hull construction 10 have a plurality of concaved tunnels 16, 22 and 24 formed therein. The tunnel 16 is formed along the longitudinal centerline of the hull 10 while a pair of tunnels 22 are disposed on opposite sides of and extend parallel to the tunnel 16. Further, the bottom surfaces 18 of the hull construction 10 are also provided with a pair of tunnels 24 which are disposed immediately adjacent and outwardly of the tunnels 22 and also extend substantially parallel to the longitudinal centerline of the hull construction 10. Each of the tunnels 16, 22 and 24 extend into the forward or bow portion 14 of the hull and curve upwardly as can be most clearly seen from FIGURE 2 of the drawings.

The tunnels 16, 22 and 24 are disposed immediately adjacent each other and defined by depending and longitudinally extending cut-waters 26 which are disposed between adjacent tunnels and along the remote longitudinal side edges of the outermost tunnels 24. The cut-waters 26 in the forward portion 14 of the hull construction 10 are formed generally by a series of three transversely extending reversely curving surfaces extending longitudinally of said hull which gradually taper toward the rear of the aft portion 12 of the hull construction 10 and merge into a pair of downwardly converging straight surfaces disposed at substantially 90° to each other.

The cut-waters 26 have a relatively great vertical extent in the forward portion 14 of the hull 10 and gradually taper rearwardly decreasing in vertical extent as they taper into the inclined and converging straight surfaces 28. Inasmuch as the cut-waters 26 decrease in vertical extent toward the rear end of the aft portion 12 of the hull construction 10, it will be noted from a comparison between FIGURES 3 and 5 that the tunnels 16, 22 and 24 are substantially arcuate in cross-section in the forward portion 14 of the hull construction 10 and that they taper to relatively shallow inverted U-shaped tunnels toward the rear of the aft portion 12.

It is to be understood that the hull construction is adapted to plane on relatively calm water with substantially its entire forward or bow portion 14 out of the water. The tunnels 16, 22 and 24 of the aft portion as well as the cut-waters 26 formed on the aft portion 12 extend substantially parallel to the longitudinal center line of the hull construction so that the drag of the wetted surfaces of the hull construction will be maintained at a minimum. The hull construction 10 is therefore substantially as broad at its rear end as it is at its maximum beam and therefore the drag of the hull construction 10 on the water is maintained at a minimum.

It is of course to be noted that the tunnels 16, 22 and 24 in the aft portion 12 of the hull construction 10 are continuous with corresponding tunnels formed in the forward or bow portion 14 so that smooth unbroken planing surfaces are provided.

The upper edges of each of the side surfaces 20 have an outwardly projecting and horizontally disposed flange 30 extending therefrom which terminates at its free outer end in a downturned substantially vertical flange 32. The flanges 30 and 32 formed along the upper edges of each of the side surfaces 20 form an air tunnel 34 which is adapted to afford additional stability to the hull construction 10 while travelling at high speeds. Further, the tunnel 34 also provides a means for downwardly deflecting any water spray caused by the movement of the hull construction 10 through water. In operation, while the hull 10 is travelling over the surface of a body of water at relatively high speeds, the tunnels 16, 22 and 24 entrap air which then passes between the cut-waters 26 under the hull 10. As the air entrapped by the tunnels moves under the aft portion 12 of the hull 10 it forms thin wide ribbons of compressed air over which the hull 10 rides. The air entrapped under the aft portion 12 of the hull 10 not only increases the smooth riding characteristics but also greatly reduces the friction between the wetted area of the hull 10 and the water over which it is travelling. Still further the cut-waters 26 provide extreme stability to the construction 10 while executing sharp turns at high speeds and if it is desired additional cut-waters 36 may be provided in the aft portion 12 of the tunnels 24 to further increase the stability of the hull 10 while executing sharp turns at high speeds. Each of the cut waters 26 and 36 greatly reduce the tendency of the hull to slide laterally during high speed turns.

The cut-waters 26 formed on the forward or bow portion 14 of the hull 10 cut into the water to break up any waves which may be present. The force of the waves is therefore greatly depleted and the result is a much smoother ride and less wear and tear on the hull 10 caused by overstressing the components of the hull 10 by hitting solid waves at relatively high speeds.

The hull construction, being provided with the tunnels 16, 22 and 24 defined by the cut-waters 26, is able to navigate in relatively heavy seas at substantial speeds wtihout undue pounding and without darting from one side to the other while encountering waves from either quarter.

Attention is now directed to FIGURES 6 and 7 of the drawings wherein it will be noted that the hull construction 10 is particularly well adapted for dual propeller installations as well as single propeller installations. If the hull construction 10 is to be provided with dual propeller installation the two propellers are disposed in vertical alignment with the tunnels 22 while a single installation propeller is disposed in vertical alignment with the center tunnel 16.

The aligning of the propellers 38 with certain of the tunnels insures that the water through which the propellers will pass will be relatively calm and not extremely turbulent. The tunnels also enable the propellers 38 to be positioned closer to the surface of the water passing beneath the hull 10 which, in the case of outboard motors, enables a lesser portion of the lower unit of the outboard motor or motors to be submerged in the water which reduces the drag and therefor increase the speed of the hull 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a marine craft, a hull, said hull including an aft portion having substantially straight longitudinally extending bottom and side surfaces and a forward portion defining a bow with inwardly converging side surfaces and upwardly curving bottom surfaces, said aft and forward bottom and side surfaces being continuous to form smooth unbroken longitudinally extending surfaces, at least three longitudinally extending, transversely spaced and substantially parallel concave tunnels formed in said aft bottom surfaces defined by depending longitudinally extending cut-waters disposed between adjacent tunnels and along the remote longitudinal edges of the outermost tunnels, said cut-waters each being substantially wedge shaped in transverse cross-section, said tunnels terminating in said forward portion in inwardly converging and upwardly curving forward tunnels disposed in side-by-side relation with their forward ends open to receive air funneled thereinto, corresponding fore and aft tunnels being continuous said tunnels formed on said aft portion being substantially arcuate in cross-section and tapering gradually rearwardly decreasing in depth forming relatively shallow inverted U-shaped tunnels wherein air will be entrapped in said tunnels arcuate in cross-section and will pass under the aft portion of said hull to cushion the ride of the hull through the water and reduce friction to a minimum.

2. The combination of claim 1 wherein said cut-waters in said forward hull portion are each formed by three successive transversely extending reversely curving longitudinally extending surfaces which gradually taper into two downwardly convergent straight surfaces disposed at substantially 90° to each other at the rear end of said aft portion of said hull.

3. In a marine craft, a hull, said hull including an aft portion having substantially straight longitudinally extending bottom and side surfaces and a forward portion defining a bow with inwardly converging side surfaces and upwardly curving bottom surfaces, said aft and forward bottom and side surfaces being continuous to form smooth unbroken longitudinally extending surfaces, at least three longitudinally extending, transversely spaced and substantially parallel concave tunnels formed in said aft bottom surfaces defined by depending longitudinally extending cut-waters disposed between adjacent tunnels and along the remote longitudinal edges of the outermost tunnels, said cut-waters each being substantially wedge shaped in transverse cross-section, said tunnels terminating in said forward portion in inwardly converging and upwardly curving forward tunnels, corresponding fore and aft tunnels being continuous, one of said tunnels extending substantially the entire length of said hull along its longitudinal center line with the other two tunnels disposed on opposite sides thereof, each of the aft portions of said tunnels being of a width adapted to span the diameter of a marine propeller whereby a single propeller may be aligned with said one tunnel nad a dual motor installation may have its two propellers aligned with said other two tunnels.

4. The combination of claim 3 including fourth and fifth tunnels formed in said hull and disposed immediately adjacent and outwardly of said other two tunnels which each terminate at the outer longitudinal edges along the lower edges of said side surfaces.

5. The combination of claim 4 including a longitudinally extending cut-water formed in the center of the portions of said fourth and fifth tunnels disposed on the aft portion of said hull to increase the stability of the latter during high speed turns and to reduce the tendency of the hull to slide laterally during high speed turns.

6. In a marine craft, a hull, said hull including an aft portion having substantially straight longitudinally extending bottom and side surfaces and a forward portion defining a bow with inwardly converging side surfaces and upwardly curving bottom surfaces, said aft and forward bottom and side surfaces being continuous to form smooth unbroken longitudinally extending surfaces, at least three longitudinally extending, transversely spaced and substantially parallel concave tunnels formed in said aft bottom surfaces defined by depending longitudinally extending cut-waters disposed between adjacent tunnels and along the remote longitudinal edges of the outermost tunnels, said cut-waters each being substantially wedge shaped in cross section, said tunnels terminating in said forward portion in upwardly curving forward tunnels disposed in spaced side-by-side relation with their forward end portions open to receive air funneled thereinto, corresponding fore and aft tunnels being continuous, one of said tunnels extending substantially the entire length of said hull along its longitudinal center line with the other two tunnels disposed on opposite sides thereof, each of the aft portions of said tunnels being of a width adapted to span the diameter of a marine propeller whereby a single propeller may be aligned with said one tunnel and a dual motor installation may have its two propellers aligned with said other two tunnels.

References Cited in the file of this patent
UNITED STATES PATENTS

| | | |
|---|---|---|
| D. 160,027 | Smith | Sept. 5, 1950 |
| 359,861 | Hanlen | Mar. 22, 1887 |
| 649,525 | Nichol | May 15, 1900 |
| 1,189,227 | Baker | July 4, 1916 |
| 2,234,899 | Higgins | Mar. 11, 1941 |
| 2,366,590 | Brownback | Jan. 2, 1945 |
| 2,515,005 | Hickman | July 11, 1950 |
| 2,875,720 | Hupp | Mar. 3, 1959 |
| 2,938,490 | Martin | May 31, 1960 |

FOREIGN PATENTS

| | | |
|---|---|---|
| 2,292 | Great Britain | 1903 |
| 571,365 | Great Britain | Aug. 21, 1945 |